July 7, 1936.   R. P. LANSING   2,047,077
CLUTCH MECHANISM
Filed May 20, 1931
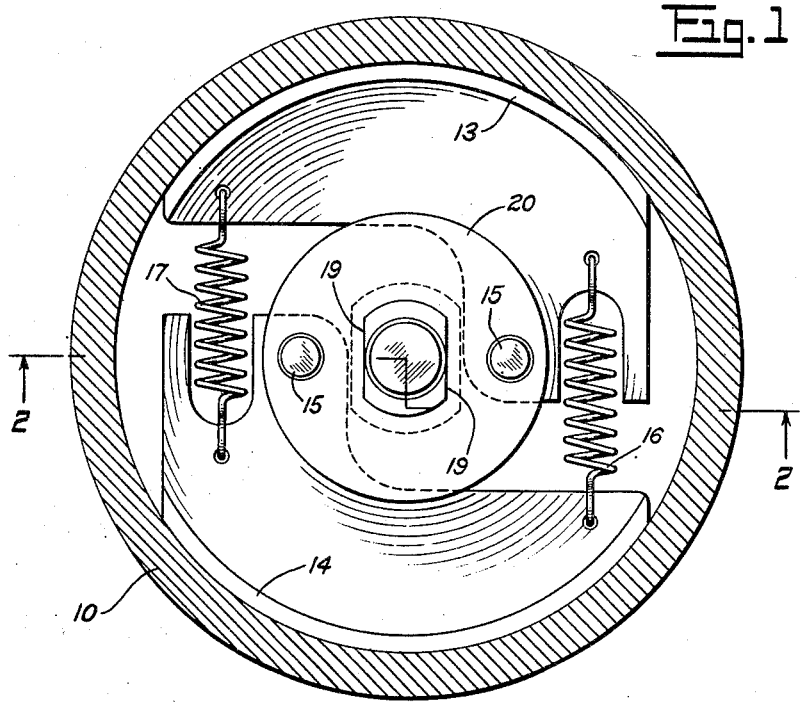
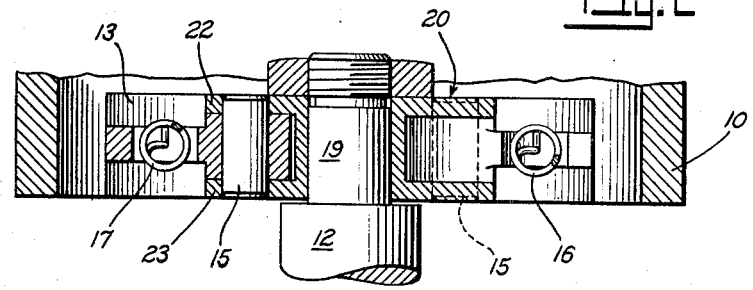
INVENTOR.
Raymond P. Lansing
BY
ATTORNEYS Patented July 7, 1936

2,047,077

UNITED STATES PATENT OFFICE 2,047,077

CLUTCH MECHANISM

Raymond P. Lansing, Montclair, N. J., assignor to Eclipse Aviation Corporation, East Orange, N. J., a corporation of New Jersey Application May 20, 1931, Serial No. 538,798

2 Claims. (Cl. 192—105)

This invention relates to clutch mechanism and more particularly to a clutch of the centrifugal type.

The object of the invention is to provide a clutch mechanism of the indicated character, embodying the features of novelty pointed out in the following specification and illustrated in the accompanying drawing representing the preferred embodiment of the invention, the limits of the said invention being defined in the appended claims.

In the drawing:—

Fig. 1 is a transverse sectional view of a device embodying the invention; and

Fig. 2 is a longitudinal sectional view along the line of 2—2 of Fig. 1.

The invention is shown as applied to a driving shaft 12 and a driven cylinder or drum 10 adapted to be drivably connected to the work element to be actuated, as for example, the inertia member or flywheel of an engine starting mechanism of the inertia type. As shown, the cylindrical surface of the drum is disposed in coaxial relation to the driving shaft 12, and in position to be engaged by arcuate driving shoes 13 and 14 upon outward movement of the latter from the position indicated in Fig. 2, in response to the centrifugal action resulting from rotation of driving shaft 12. Suitable means consisting of tension springs 16 and 17, connected at their ends to the shoes as indicated in Fig. 1, are provided to hold the shoes normally away from the drum 10.

The pivotal connection between driving shaft 12 and the shoes is preferably effected by rigidly securing to the said shaft (as by forming a "double D" thereon, as indicated at 19 in Figs. 1 and 2) an annular retaining plate 20 having a channel-shaped cross-section providing a circumferential groove for the reception of the inner portions of shoes 13 and 14, said inner portions being apertured for insertion of pins 15 which extend through the outer parallel walls 22 and 23 of the retaining plate 20, the pins being secured against axial movement by peening the ends thereof, or by other suitable key means.

The operation of the device is as follows:— Upon energization of the driving shaft 12 the resultant centrifugal force causes an outward movement of the shoes 13 and 14 and a corresponding increase of the tension springs 16 and 17, until the outward movement is sufficient to bring the shoes into engagement with the inner surface of drum 10, thus establishing driving relationship between the driving shaft 12 and the load to be driven. This driving relationship will continue until de-energization of the driving shaft, whereupon springs 16 and 17 become effective to withdraw the shoes from contact with the drum, returning them to the disengaged position indicated in Fig. 2.

What is claimed is:

1. In a device of the class described, a driving member, a driven member, a pair of pivot pins rotatable with the driving member, a pair of driving shoes pivotally mounted on said pivot pins, and means comprising a pair of springs each having each end engageable with said shoes to constantly oppose the centrifugal force exerted on said shoes, said shoes having engaging surfaces subtended by chords disposed in parallelism with the plane passing through the axes of said pivot pins.

2. In a device of the class described, a driving member, a driven member, a pair of driving shoes rotatable with said driving member, means for mounting said shoes in position to engage said driven member by the action of centrifugal force upon rotation of said driving member, and means comprising a pair of springs each having each end engageable with said shoes to constantly oppose the centrifugal force exerted on such shoes, said shoes having engaging surface subtended by chords disposed in parallelism with the plane passing through said mounting means.

RAYMOND P. LANSING.